US012789911B2

(12) United States Patent
Sasano et al.

(10) Patent No.: US 12,789,911 B2
(45) Date of Patent: Nov. 10, 2026

(54) VEHICLE FRONT STRUCTURE

(71) Applicant: Honda Motor Co., Ltd., Tokyo (JP)

(72) Inventors: Yamato Sasano, Tokyo (JP); Takehiro Kondo, Tokyo (JP); Akira Haga, Tokyo (JP); Yuya Kawano, Tokyo (JP); Ken Satoh, Tokyo (JP); Masahiro Abiko, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 363 days.

(21) Appl. No.: 18/403,728

(22) Filed: Jan. 4, 2024

(65) Prior Publication Data

US 2024/0270321 A1 Aug. 15, 2024

(30) Foreign Application Priority Data

Feb. 9, 2023 (CN) ......................... 202310085305.6

(51) Int. Cl.
*B62D 25/20* (2006.01)
*B62D 25/02* (2006.01)
*B62D 25/14* (2006.01)

(52) U.S. Cl.
CPC ......... *B62D 25/145* (2013.01); *B62D 25/025* (2013.01); *B62D 25/2018* (2013.01)

(58) Field of Classification Search
CPC .... B62D 25/14; B62D 25/145; B62D 25/025; B62D 25/2018; B62D 25/2036; B62D 25/08; B62D 25/04
USPC ............ 296/70, 187.08, 187.09, 191, 193.09
See application file for complete search history.

(56) References Cited

U.S. PATENT DOCUMENTS 9,776,670 B2 * 10/2017 Park ........................ B62D 65/02
2015/0145284 A1 * 5/2015 Nishida ................ B62D 25/145 296/187.1
2016/0052561 A1 * 2/2016 Atsumi .............. B62D 25/2018 296/187.08
2017/0080978 A1 * 3/2017 Yoshida ............. B62D 25/2018
2020/0223493 A1 * 7/2020 Gill ..................... B62D 25/2045
2023/0286593 A1 * 9/2023 Kawano ............. B62D 25/2036
2024/0253707 A1 * 8/2024 Maeda ................... B62D 25/14

FOREIGN PATENT DOCUMENTS

JP 2015093507 5/2015

* cited by examiner

*Primary Examiner* — Wenwei Zhuo
(74) *Attorney, Agent, or Firm* — JCIPRNET

(57) ABSTRACT

A vehicle front structure includes: a floor panel; a dash panel including a curved part curved toward the floor panel at a lower part of the dash panel; a front frame, disposed on a vehicle inner side of the dash panel, and extending along the dash panel to the floor panel; a cross member, disposed on the vehicle inner side of the dash panel, and extending downward from the front frame toward an outer side; and a stiffener, disposed on a vehicle outer side of the dash panel, and sandwiching, together with the cross member, the dash panel. The cross member and the stiffener are each provided with corresponding upper and lower cross-sectional parts configured as closed cross-sectional surfaces by using lid-like structures. In the dash panel, the lower cross-sectional parts are formed at the curved part, and the upper cross-sectional parts are formed higher than the lower cross-sectional parts.

10 Claims, 6 Drawing Sheets

VEHICLE FRONT STRUCTURE

CROSS-REFERENCE TO RELATED APPLICATION

This application claims the priority benefit of China application no. 202310085305.6, filed on Feb. 9, 2023. The entirety of the above-mentioned patent application is hereby incorporated by reference herein and made a part of this specification.

BACKGROUND

Technical Field

The disclosure relates to a vehicle front structure.

Description of Related Art

In recent years, more and more efforts have been made to provide access to sustainable transportation systems that take into account vulnerable transportation participants such as the elderly and children. For this purpose, research and development efforts have been made to further improve traffic safety or convenience through development related to vehicle body rigidity. In the development related to vehicle body rigidity, the structural rigidity of a vehicle front structure has become an issue.

For example, in a vehicle front structure of the conventional art formed by components such as a dash panel, a floor panel, etc., components such as a front frame extending in the vehicle front-rear direction, a cross member extending in the vehicle width direction, etc., are provided on the upper side of the floor panel (i.e., vehicle inner side) to transmit/disperse a collision load. The cross member has a cross-sectional part having a closed cross-sectional surface formed by using a lid-like structure to facilitate the structural rigidity of the vehicle front structure. However, a curved part with a lower structural rigidity is provided at the lower end of the dash panel, and the conventional cross member is not arranged to cope with the portion with a lower structural rigidity in the dash panel. When a front collision occurs in a vehicle to which the vehicle front structure is applied, the load transmitted from a component (e.g., a side frame) on the front side of the dash panel to the dash panel is taken by a portion on the upper side with respect to the curved part. In addition, if the cross-sectional area of the cross member on the vehicle inner side is to be increased to facilitate the structural rigidity, the space of the vehicle inner side may be narrowed. Thus, there is a necessity to facilitate the structural rigidity of the vehicle front structure while optimizing the spatial layout on the vehicle inner side.

According to the disclosure, vehicle body rigidity is facilitated and spatial layout on the vehicle inner side is optimized by effectively transmitting a collision load from the periphery of the curved part of the dash panel toward the outer side in the vehicle width direction. The disclosure thus also makes contribution to the development of sustainable transportation systems.

The disclosure provides a vehicle front structure capable of facilitating the vehicle body rigidity and optimizing the spatial layout on the vehicle inner side by effectively transmitting a collision load from the periphery of a curved part of a dash panel toward an outer side in a vehicle width direction.

SUMMARY

A vehicle front structure according to an aspect of the disclosure includes: a floor panel, disposed on a lower end side of a vehicle; a dash panel, disposed on a front end side of the floor panel to partition a vehicle compartment and a front compartment, wherein a curved part curved toward the floor panel is provided at a lower part of the dash panel; a front frame, disposed on a vehicle inner side of the dash panel, and extending along the dash panel to the floor panel in a vehicle front-rear direction; a cross member, disposed on the vehicle inner side of the dash panel, and extending downward from the front frame toward an outer side in a vehicle width direction; and a stiffener, disposed on a vehicle outer side of the dash panel, and sandwiching, together with the cross member, the dash panel. The cross member and the stiffener are each provided with an upper cross-sectional part and a lower cross-sectional part configured as closed cross-sectional surfaces by using lid-like structures and corresponding to each other. The lower cross-sectional parts are formed at the curved part of the dash panel, and the upper cross-sectional parts are formed at positions higher than the lower cross-sectional parts in the dash panel.

DESCRIPTION OF THE EMBODIMENTS

Figure 1:
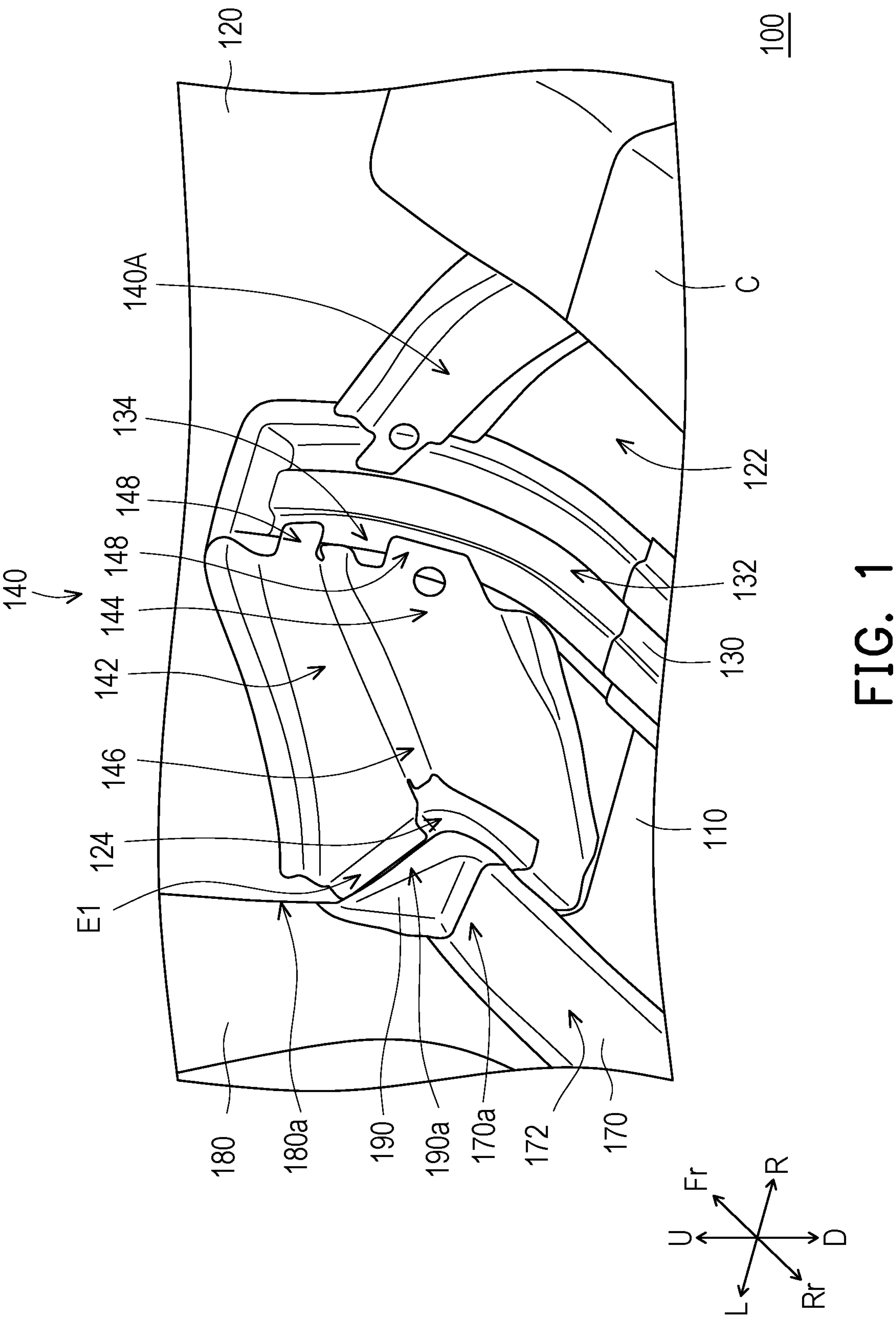
FIG. 1 is a schematic perspective view illustrating a vehicle front structure according to an embodiment of the disclosure.

A vehicle front structure according to an aspect of the disclosure includes: a floor panel, disposed on a lower end side of a vehicle; a dash panel, disposed on a front end side of the floor panel to partition a vehicle compartment and a front compartment, wherein a curved part curved toward the floor panel is provided at a lower part of the dash panel; a front frame, disposed on a vehicle inner side of the dash panel, and extending along the dash panel to the floor panel in a vehicle front-rear direction; a cross member, disposed on the vehicle inner side of the dash panel, and extending downward from the front frame toward an outer side in a vehicle width direction; and a stiffener, disposed on a vehicle outer side of the dash panel, and sandwiching, together with the cross member, the dash panel. The cross member and the stiffener are each provided with an upper cross-sectional part and a lower cross-sectional part configured as closed cross-sectional surfaces by using lid-like structures and corresponding to each other. The lower cross-sectional parts are formed at the curved part of the dash panel, and the upper cross-sectional parts are formed at positions higher than the lower cross-sectional parts in the dash panel.

In an embodiment of the disclosure, the cross member and the stiffener extend downward toward the outer side in the vehicle width direction, and are each provided with a concave part recessed toward the dash panel between the upper cross-sectional part and the lower cross-sectional part.

According to an embodiment of the disclosure, the vehicle front structure further includes: a side frame, disposed in front of the dash panel. The front frame and the side frame are arranged along the vehicle front-rear direction to sandwich the dash panel. The front frame and an upper flange of the side frame are at least partially overlapped.

According to an embodiment of the disclosure, the vehicle front structure further includes: a side sill, disposed on each of two sides of the floor panel in the vehicle width direction, and extending along the vehicle front-rear direction. Upper surfaces of the upper cross-sectional parts on an inner side in the vehicle width direction are respectively bonded to upper surfaces of the front frame and the side frame. Lower ends of the upper cross-sectional parts are inclined downward and extend along the vehicle width direction to positions higher than an upper surface of the side sill.

According to an embodiment of the disclosure, the vehicle front structure further includes: a pillar, disposed above the side sill, and extending along the vehicle upper-lower direction; and a triangular gusset, bonded to the upper surface of the side sill and a vehicle inner surface of the pillar, and having an inclined surface obliquely extending upward from an inner side of the side sill toward the pillar. A bevel part is provided at a lower end of the dash panel on the outer side in the vehicle width direction, and the bevel part is inclined upward from a lower part toward the outer side in the vehicle width direction. The bevel part of the dash panel, the upper surface of the side sill, and the vehicle inner surface of the pillar form an opening part, and the triangular gusset is fit in the opening part by bonding the inclined surface to the bevel part. An outer end of the cross member in the vehicle width direction is bonded to the bevel part.

According to an embodiment of the disclosure, an upper edge of the stiffener on the outer side in the vehicle width direction is bonded to the pillar, and a lower surface of the stiffener on the outer side in the vehicle width direction is bonded to a lower surface of the side sill, and the lower cross-sectional part of the stiffener extends downward and covers the curved part of the dash panel, so as to form a cross-sectional surface greater than the upper cross-sectional part.

According to an embodiment of the disclosure, the front frame is provided with a bead part extending in the vehicle front-rear direction, and the cross member is provided with a protrusion part bonded to the bead part of the front frame.

According to an embodiment of the disclosure, an opposing surface of the upper cross-sectional part facing the dash panel has a width in the vehicle upper-lower direction, and the width gradually increases toward the outer side in the vehicle width direction.

According to an embodiment of the disclosure, in the upper cross-sectional part and the lower cross-sectional part of the cross member, a distance from an opposing surface of the upper cross-sectional part facing the dash panel to the dash panel is greater than a distance of an opposing surface of the lower cross-sectional part facing the dash panel to the dash panel.

According to an embodiment of the disclosure, in the upper cross-sectional part and the lower cross-sectional part of the cross member, a distance between a pair of lateral surfaces extending from the opposing surface of the lower cross-sectional part toward the dash panel is greater than a distance between a pair of lateral surfaces extending from the opposing surface of the upper cross-sectional part toward the dash panel.

Based on the above, in the vehicle front structure according to the embodiments of the disclosure, the cross member is disposed on the vehicle inner side of the dash panel, the stiffener is disposed on the vehicle outer side of the dash panel, and the stiffener and the cross member together sandwich the dash panel. In addition, the cross member and the stiffener are each provided with the upper cross-sectional part and the lower cross-sectional part configured as closed cross-sectional surfaces by using lid-like structures and corresponding to each other. The lower cross-sectional part is formed at the curved part of the dash panel, and the upper cross-sectional part is formed at a position higher than the lower cross-sectional part in the dash panel. In this way, when a front collision occurs in the vehicle to which the vehicle front structure is applied, the upper cross-sectional parts are able to transmit the load transmitted from a component (e.g., a side frame) on the front side of the dash panel to the dash panel to the outer side in the vehicle width direction, and the lower cross-sectional parts are able to suppress the deformation of the curved part of the dash panel toward the vehicle inner side in addition to transmitting the load. Moreover, with the stiffener on the vehicle outer side and the cross member together sandwiching the dash panel, the size of the cross member on the vehicle inner side can be prevented from increasing. That is, it is not necessary to dispose a cross member having a large cross-sectional area. The rigidity of the cross member at a reduced height is facilitated by using the stiffener. Moreover, when an excessive load is input at the time of a front collision, damages to other components can be alleviated by absorbing the collision load through the deformation of the upper cross-sectional parts and the lower cross-sectional parts. Thus, the vehicle front structure according to the embodiments of the disclosure is capable of facilitating the vehicle body rigidity and optimizing the spatial layout on the vehicle inner side by effectively transmitting the collision load from the periphery of the curved part of the dash panel toward the outer side in the vehicle width direction.

Figure 2:
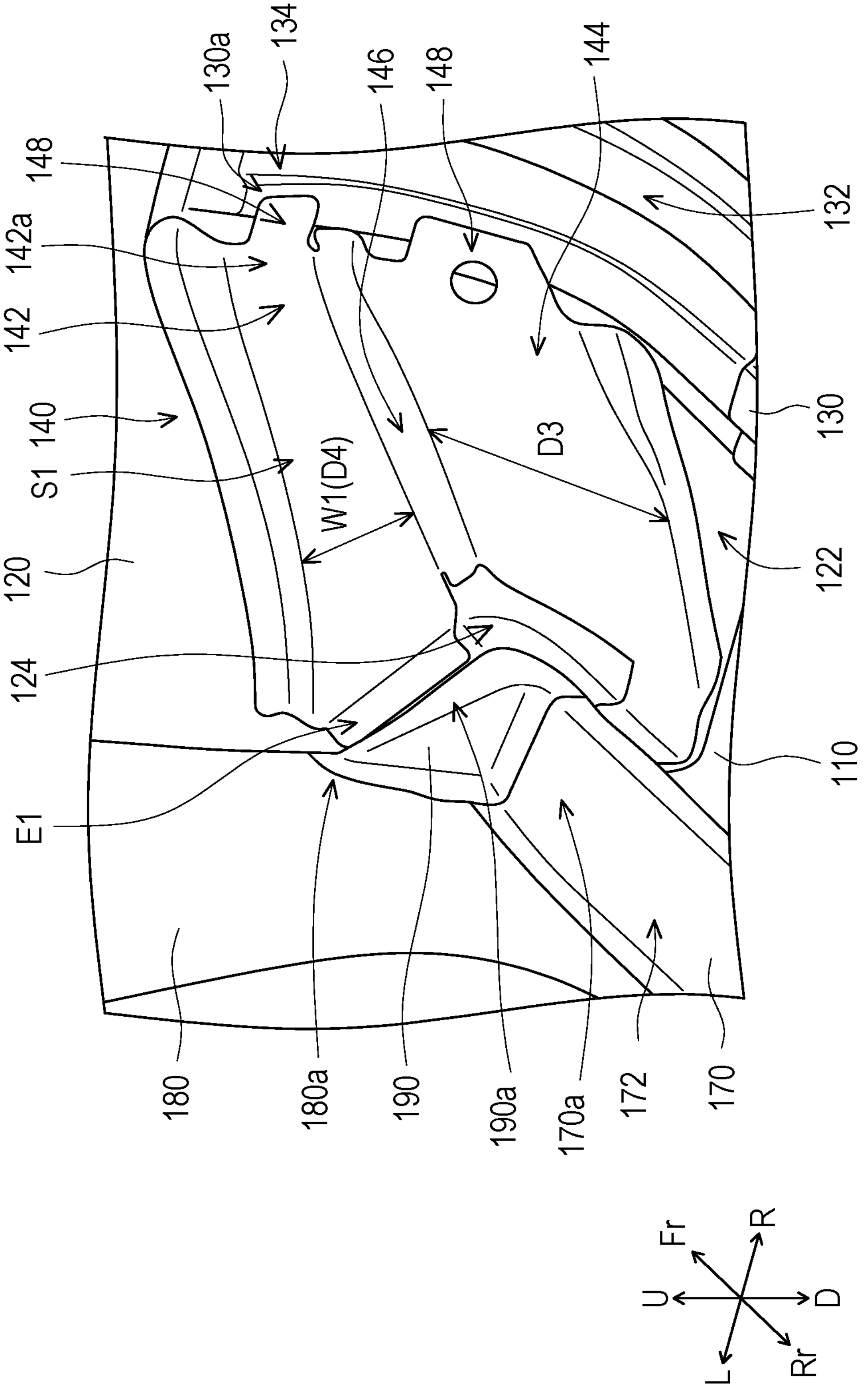
FIG. 2 is a partially enlarged schematic view illustrating the vehicle front structure shown in FIG. 1 at a cross member.
Figure 3:
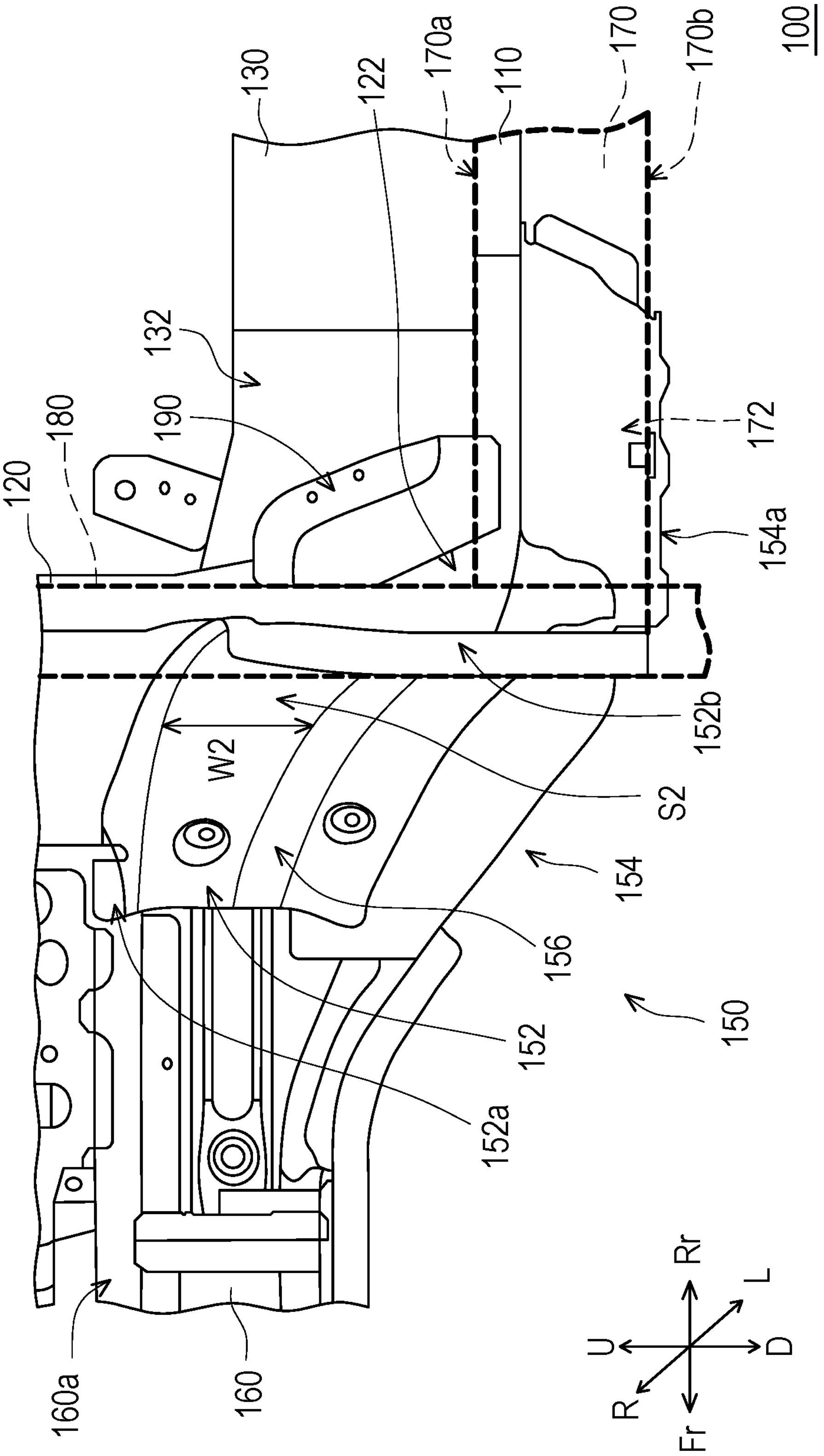
FIG. 3 is a partially enlarged schematic view illustrating the vehicle front structure shown in FIG. 1 at a stiffener.
Figure 4:
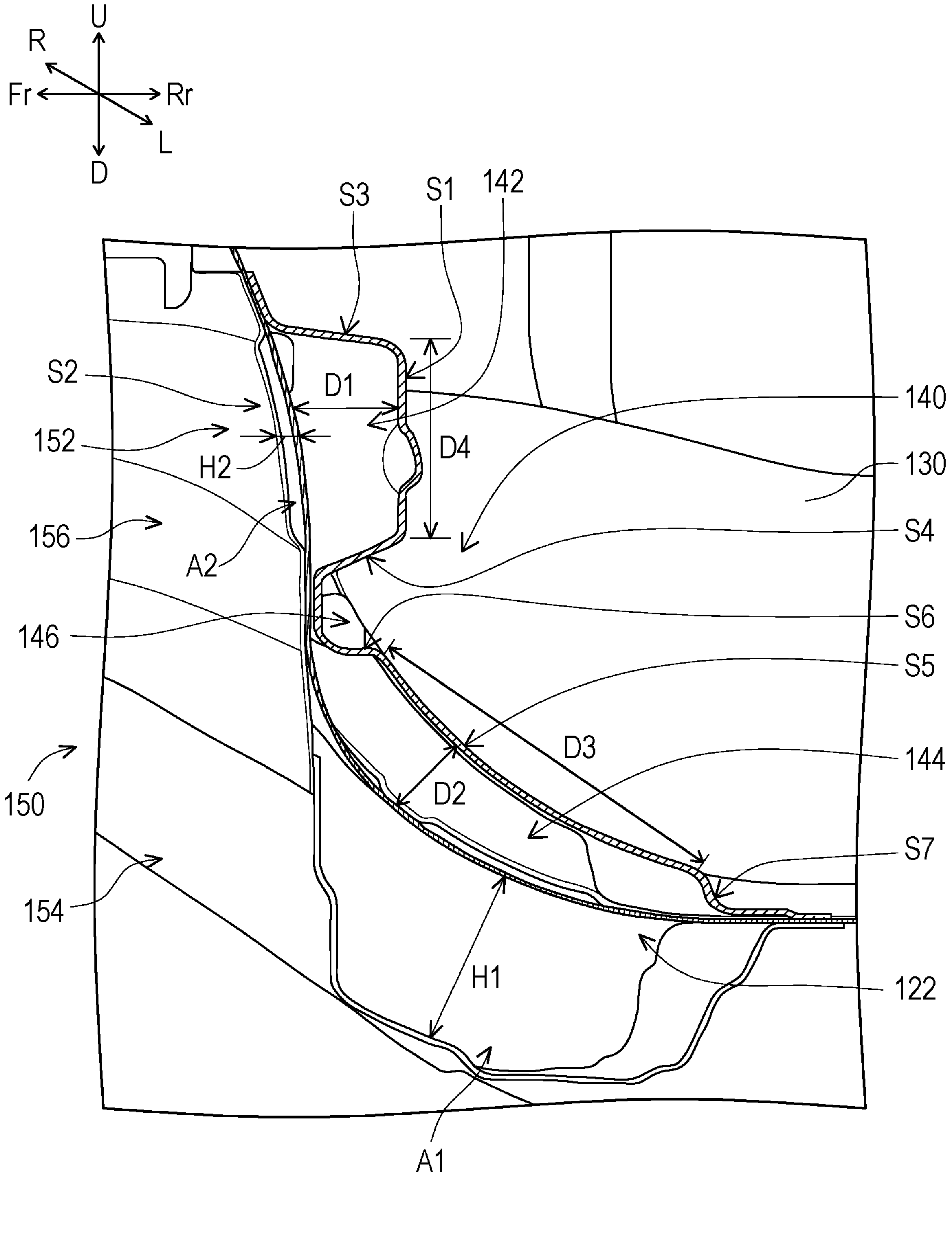
FIG. 4 is a partial schematic cross-sectional view illustrating the vehicle front structure shown in FIG. 1 at an upper cross-sectional part and a lower cross-sectional part.
Figure 5:
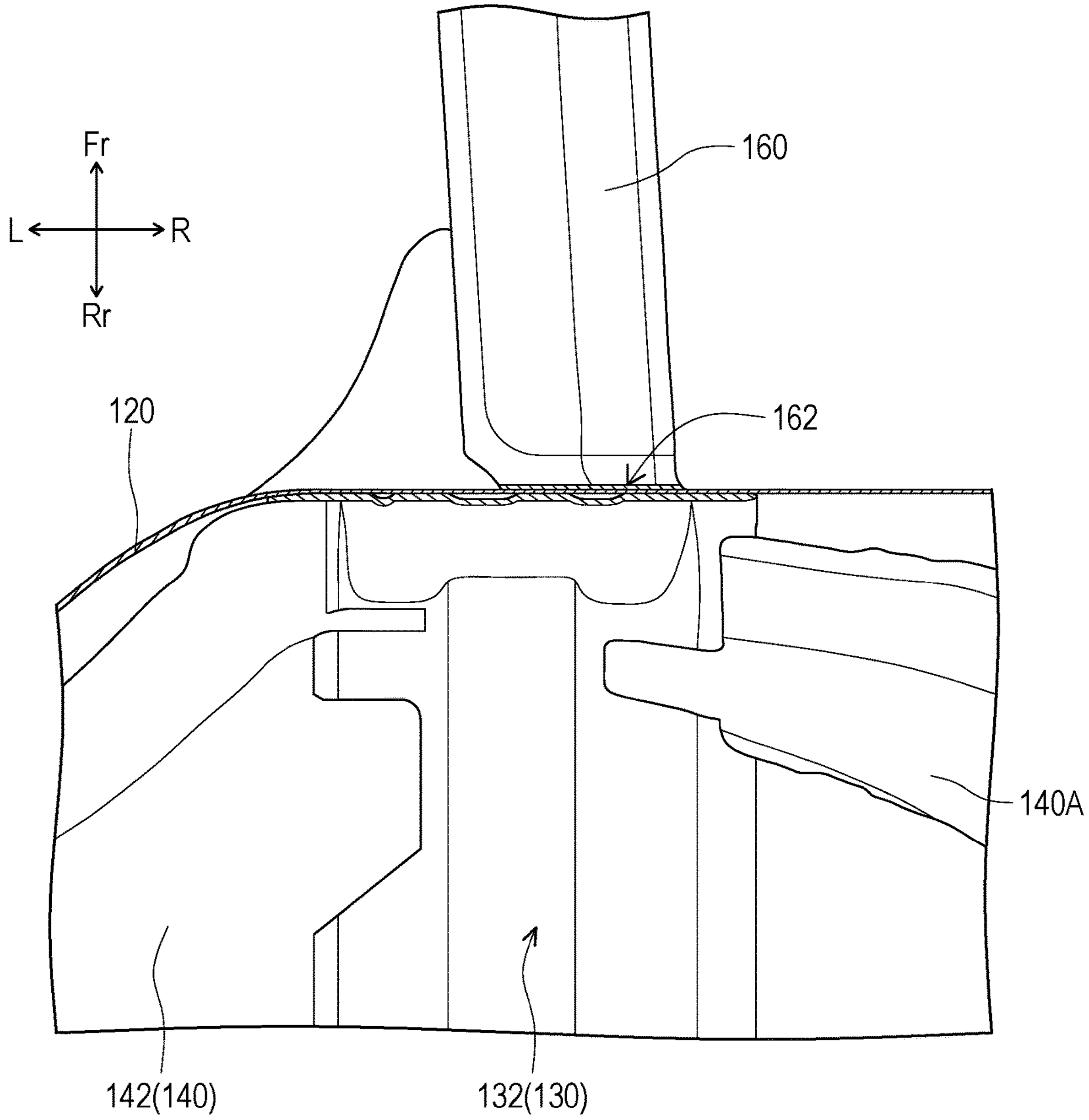
FIG. 5 is a schematic top view illustrating the vehicle front structure shown in FIG. 1 at a side frame.
Figure 6:
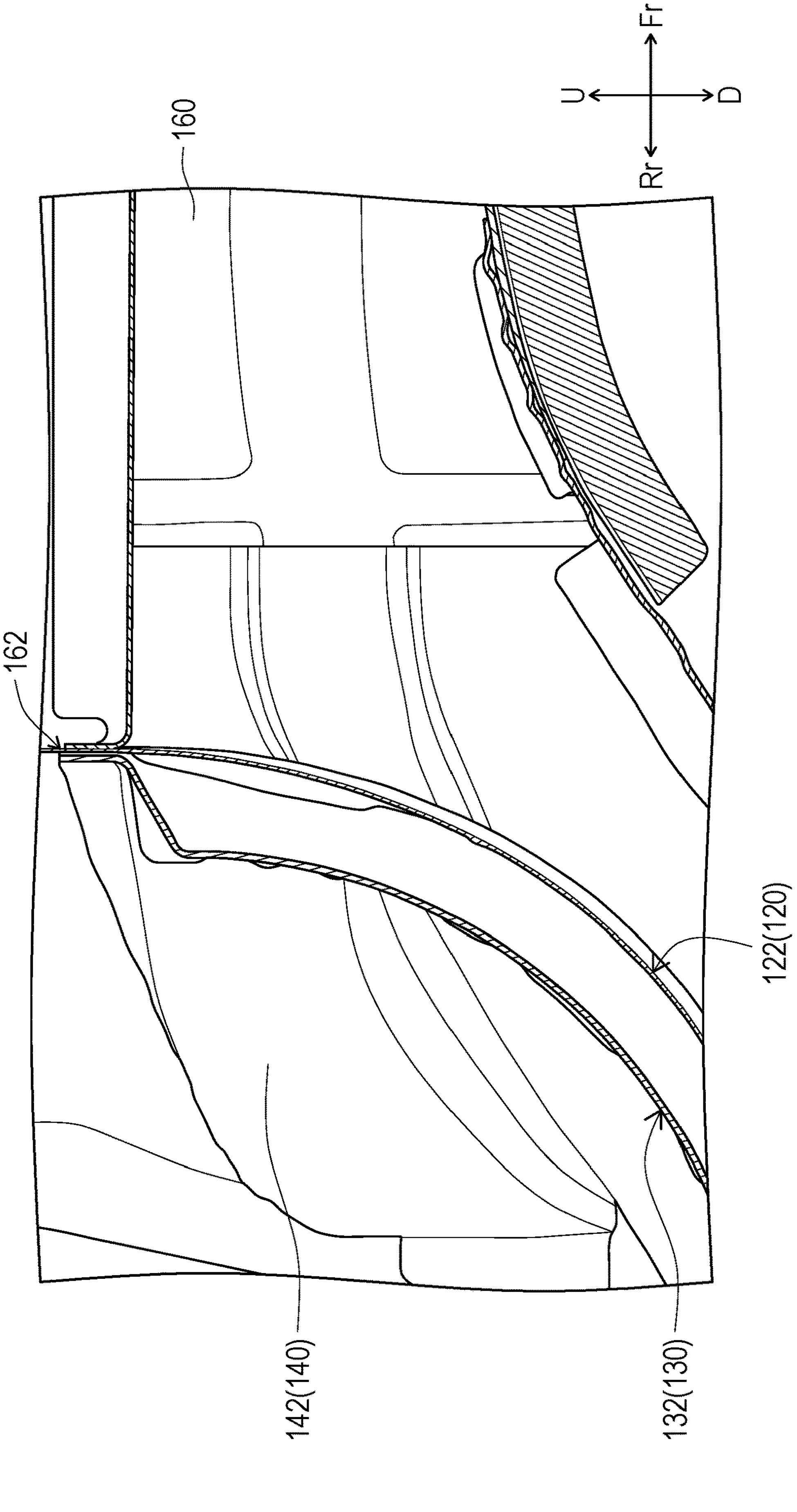
FIG. 6 is a partial schematic side view illustrating the vehicle front structure shown in FIG. 5.

FIG. 1 is a schematic perspective view illustrating a vehicle front structure according to an embodiment of the disclosure. FIG. 2 is a partially enlarged schematic view illustrating the vehicle front structure shown in FIG. 1 at a cross member. FIG. 3 is a partially enlarged schematic view illustrating the vehicle front structure shown in FIG. 1 at a stiffener. FIG. 4 is a partial schematic cross-sectional view illustrating the vehicle front structure shown in FIG. 1 at an upper cross-sectional part and a lower cross-sectional part. FIG. 5 is a schematic top view illustrating the vehicle front structure shown in FIG. 1 at a side frame. FIG. 6 is a partial schematic side view illustrating the vehicle front structure shown in FIG. 5. In the following, a detailed configuration of a vehicle front structure 100 according to the embodiment is described with reference to FIGS. 1 to 6. In the drawings, the vehicle-front-rear direction refers to, for example, a vehicle front direction Fr and a vehicle rear direction Rr in the drawings, the vehicle width direction refers to, for example, a vehicle left direction L and a vehicle right direction R in the drawings, and the vehicle upper-lower direction refers to, for example, a vehicle upper direction U and a vehicle lower direction D in the drawings. However, the above merely serves as an example, and the disclosure shall not be construed as being limited thereto.

Referring to FIGS. 1 to 4, in the embodiment, the vehicle front structure 100 refers to a structure on the front end side (i.e., the side corresponding to the vehicle front direction Fr) of the vehicle (not shown) in the vehicle front-rear direction. The vehicle front structure 100 includes a floor panel 110, a dash panel 120, a front frame 130, a cross member 140, and a stiffener 150. The floor panel 110 is disposed on the lower end side of the vehicle (i.e., the side corresponding to the vehicle lower direction D). The dash panel 120 is disposed on the front end side of the floor panel 110 to partition a vehicle compartment and a front compartment, and a curved part 122 curved toward the floor panel 110 is provided at a lower part of the dash panel 120. The front frame 130 is disposed on the vehicle inner side of the dash panel 120, and extends along the dash panel 120 to the floor panel 110 in the vehicle front-rear direction (i.e., the vehicle front direction Fr and the vehicle rear direction Rr). The cross member 140 is disposed on the vehicle inner side of the dash panel 120, and extends from the front frame 130 downward (i.e., the vehicle lower direction D) toward the outer side (e.g., the side corresponding to the vehicle left direction L) in the vehicle width direction. The stiffener 150 is disposed on the vehicle outer side of the dash panel 120 and sandwiches, together with the cross member 140, the dash panel 120 (as shown in FIG. 4). However, the disclosure does not intend to limit the exact position of the vehicle front structure 100 (i.e., not intend to limit the application of the vehicle front structure 100 in the vehicle), and does not intend to limit the exact structure of the vehicle to which the vehicle front structure 100 is applied, either. Relevant arrangement may be modified as needed.

Specifically, in the embodiment, as shown in FIGS. 1 to 4, the dash panel 120 is, for example, a plate member having a concave-convex structure not shown herein, and is disposed on the front side of the vehicle to be erected substantially upward in the vehicle upper-lower direction, so as to partition the vehicle compartment and the front compartment on the vehicle inner side of the vehicle. For example, the front compartment for mounting vehicle components is on the front side of the dash panel 120, and the vehicle compartment for passengers is on the rear side. The curved part 122 curved toward the rear side (i.e., the side corresponding to the vehicle rear direction Rr) is provided at a lower part of the dash panel 120. In addition, as shown in FIGS. 1 to 3, the floor panel 110 is, for example, a plate member having a concave-convex structure not shown herein to form the bottom of the vehicle front structure 100, extends in the vehicle front-rear direction, and is connected with the curved part 122 formed by the lower end of the dash panel 120. In this way, the floor panel 110 and the dash panel 120 form the base of the vehicle front structure 100, so as to define the vehicle inner side and the vehicle outer side. That is, the upper side of the floor panel 110 and the rear side of the dash panel 120 are defined as the vehicle inner side, and the lower side of the floor panel 110 and the front side of the dash panel 120 are defined as the vehicle outer side. In addition, the front frame 130, the cross member 140, and the stiffener 150 are disposed as a high rigidity structure provided on the floor panel 110 and the dash panel 120 to transmit/disperse a load.

In addition, as shown in FIGS. 1 and 2, the front frame 130 is, for example, a frame structure extending in the vehicle front-rear direction, and is disposed along the curved part 122 of the dash panel 120 across the floor panel 110 and the dash panel 120. In FIGS. 1 and 2, only one front frame 130 is shown, but a pair of front frames 130 may be disposed in the left-right direction. That is, a front end 132 of the front frame 130 is disposed along the curved part 122 of the dash panel 120 to be curved, and a portion behind the front end 132 of the front frame 130 is disposed on the floor panel 110. Correspondingly, the cross member 140 is, for example, a frame structure extending downward from the front frame 130 toward the outer side in the vehicle width direction substantially along the vehicle width direction, so as to intersect with the front frame 130 and extend in a different direction. In FIGS. 1 and 2, only one cross member 140 is shown, but a pair of cross member 140 may be disposed in the left-right direction. In addition, as shown in FIGS. 3 and 4, the stiffener 150 is, for example, a frame structure extending upward toward the outer side in substantially the vehicle width direction. In FIGS. 3 and 4, only one stiffener 150 is shown, but a pair of stiffeners 150 may be disposed in the left-right direction. In FIGS. 1 and 2, the stiffener 150 is blocked by the dash panel 120 and thus not shown. In the vehicle width direction, the stiffener 150 is disposed in correspondence with the cross member 140 on the vehicle inner side. The stiffener 150 further extends along the curved part 122 of the dash panel 120 to the lower side of the floor panel 110 (i.e., the vehicle outer side of the floor panel 110), so that the stiffener 150 and the cross member 140 together sandwich the dash panel 120. However, the structure, size, quantity and position of each component may be modified as needed. The disclosure does not intend to impose a limitation in this regard.

In addition, in the embodiment, the cross member 140 and the stiffener 150 are respectively provided with upper cross-sectional parts 142, 152 and lower cross-sectional parts 144, 154 formed as closed cross-sectional surfaces by using lid-like structures and corresponding to each other. That is, as shown in FIGS. 2 and 4, the cross member 140 disposed on the vehicle inner side of the dash panel 120 is provided with the upper cross-sectional part 142 and the lower cross-sectional part 144 formed as closed cross-sectional surfaces by using lid-like structures on the upper side and the lower side. The upper cross-sectional part 142 and the lower cross-sectional part 144 of the cross member 140 extend in substantially the vehicle width direction, and cover the vehicle inner side of the dash panel 120 with the open sides of the lid-like structures facing the dash panel 120, thereby forming the closed cross-sectional surfaces. Correspondingly, as shown in FIGS. 3 and 4, the stiffener 150 disposed on the vehicle outer side of the dash panel 120 is provided with the upper cross-sectional part 152 and the lower cross-sectional part 154 formed as closed cross-sectional surfaces by using lid-like structures on the upper side and the lower side. The upper cross-sectional part 152 and the lower cross-sectional part 154 of the stiffener 150 extend in substantially the vehicle width direction, and cover the vehicle outer side of the dash panel 120 with the open sides of the lid-like structures facing the dash panel 120, thereby forming the closed cross-sectional surfaces. In addition, as shown in FIG. 4, the upper cross-sectional part 142 of the cross member 140 and the upper cross-sectional part 152 of the stiffener 150 correspond to each other, with the dash panel 120 interposed therebetween, and the lower cross-sectional part 144 of the cross member 140 and the lower cross-sectional part 154 of the stiffener 150 correspond to each other, with the dash panel 120 interposed therebetween. In addition, the lower cross-sectional parts 144, 154 are formed at the curved part 122 of the dash panel 120, and the upper cross-sectional parts 142, 152 are formed at positions higher than the lower cross-sectional parts 144, 154 in the dash panel 120. Although the drawings show that the upper cross-sectional part 142 and the lower cross-sectional part 144 of the cross member 140 are formed by a single plate member, whereas the upper cross-sectional part 152 and the lower cross-sectional part 154 of the stiffener 150 are formed by connecting two plate members (e.g., a plate member on the upper side extends in the vehicle upper-lower direction to form the upper cross-sectional part 152 and a portion of the lower cross-sectional part 154, whereas a plate member on the lower side extends toward the bottom of the floor panel 110 to form another portion of the lower cross-sectional part 154, the lower cross-sectional part 154 being configured as a structure with a greater cross-sectional area to cover the curved part 122 by using the two plate members), it is also possible to form the stiffener 150 by using a single plate member. The structure of each component may be modified as needed. The disclosure does not intend to impose a limitation in this regard.

Accordingly, it is known that, in the embodiment, the cross member 140 is disposed on the vehicle inner side of the dash panel 120, the stiffener 150 is disposed on the vehicle outer side of the dash panel 120, and the stiffener 150 and the cross member 140 together sandwich the dash panel 120. The cross member 140 and the stiffener 150 are respectively provided with the upper cross-sectional parts 142, 152 and the lower cross-sectional parts 144, 154 formed as closed cross-sectional surfaces by using lid-like structures and corresponding to each other. The lower cross-sectional parts 144, 154 are formed at the curved part 122 of the dash panel 120, and the upper cross-sectional parts 142, 152 are formed at positions higher than the lower cross-sectional parts 144, 154 in the dash panel 120. In this way, when a front collision occurs in the vehicle to which the vehicle front structure 100 is applied, the front cross-sectional parts 142, 152 are able to transmit the load transmitted from a component (e.g., a side frame) on the front side of the dash panel 120 to the dash panel 120 to the outer side in the vehicle width direction, and the lower cross-sectional parts 144, 154 are able to suppress the deformation of the curved part 122 of the dash panel 120 toward the vehicle inner side in addition to transmitting the load. Moreover, with the stiffener 150 on the vehicle outer side and the cross member 140 together sandwiching the dash panel 120, the size of the cross member 140 on the vehicle inner side can be prevented from increasing. That is, it is not necessary to dispose a cross member 140 having a large cross-sectional area. The rigidity of the cross member 140 at a reduced height is facilitated by using the stiffener 150. Moreover when an excessive load is input at the time of a front collision, damages to other components can be alleviated by absorbing the collision load through the deformation of the upper cross-sectional parts 142, 152 and the lower cross-sectional parts 144, 154. In this way, the vehicle front structure 100 is able to effectively transmit the collision load from the periphery of the curved part 122 of the dash panel 120 toward the outer side in the vehicle width direction, thereby facilitating the vehicle body rigidity and optimizing the spatial layout on the vehicle inner side.

More specifically, in the embodiment, as shown in FIG. 3, the vehicle front structure 100 further includes a side frame 160. The side frame 160 is disposed at the front of the dash panel 120 (blocked by the dash panel 120 and therefore not shown in FIG. 1). The side frame 160 is, for example, a frame structure extending in the vehicle front-rear direction. In FIGS. 3, 5 and 6, only one side frame 160 is shown, but a pair of side frames may be disposed in the left-right direction. As shown in FIGS. 5 and 6, the front frame 130 and the side frame 160 are arranged along the vehicle front-rear direction to sandwich the dash panel 120. In addition, the front frame 130 is at least partially overlapped with an upper flange 162 of the side frame 160. In other words, the side frame 160 and the front frame 130 are respectively disposed on the front side and the rear side of the dash panel 120. In addition, the front frame 130 and the side frame 160 are bonded to each other by sandwiching the dash panel 120, and are arranged along the vehicle front-rear direction in correspondence with each other (e.g., the upper flange 162 of the side frame 160 serves as a bonding part and is at least partially overlapped with the front frame 130). In this way, when a front collision occurs in the vehicle to which the vehicle front structure 100 is applied, the front collision load is transmitted to the front frame 130 by using the side frame 160 disposed at the front of the dash panel 120, so as to be transmitted toward the rear side via the front frame 130. In this way, the load is transmitted to the outer side in the vehicle width direction via the cross member 140 bonded to the front frame 130, thereby dispersing the impact of the collision load to the vehicle front structure 100. Specifically, the front frame 130 is at least partially overlapped with the upper flange 162 of the side frame 160. Therefore, the side frame 160 and the front frame 130 are in correspondence with each other (as shown in FIGS. 3, 5, and 6) at substantially the same horizontal height. In this way, the rear side of the side frame 160 can be supported by the front frame 130, so that the tilting of the dash panel 120 due to the intrusion of the side frame 160 toward the vehicle inner side (i.e., rear side) can be suppressed at the time when the front collision occurs. However, the disclosure does not intend to limit the exact configuration of the side frame 160 as well as the relative positions of the side frame 160 and the front frame 130, etc. Relevant configuration may be modified as needed.

In addition, in the embodiment, as shown in FIGS. 1 to 3, the vehicle front structure 100 further includes a side sill 170. The side sill 170 is disposed on each of two sides of the floor panel 110 in the vehicle width direction, and extends along the vehicle front-rear direction. The side sill 170 is, for example, a frame structure extending in the vehicle front-rear direction on the floor panel 110, and a front end 172 of the side sill 170 extends to the curved part 122 of the dash panel 120. In FIGS. 1 to 3, only one side sill 170 is shown, but a pair of side sills 170 may be disposed in the left-right direction. In addition, an upper surface **142*a* of the upper cross-sectional part 142 of the cross member 140 on the inner side in the vehicle width direction is bonded to an upper surface 130*a* of the front frame 130 (as shown in FIGS. 1 and 2), and an upper surface 152*a* of the upper cross-sectional part 152 of the stiffener 150 on the inner side in the vehicle width direction is bonded to an upper surface 160*a* of the side frame 160 (as shown in FIG. 3). Moreover, the lower end of the upper cross-sectional part 142 of the cross member 140 and the lower end of the upper cross-sectional part 152 of the stiffener 150 are inclined downward and extend along the vehicle width direction to positions higher than an upper surface 170*a* of the side sill 170 (i.e., not contacting the upper surface 170*a* of the side sill 170). Correspondingly, the lower end of the lower cross-sectional part 144 of the cross member 140 extends to the inner side of the side sill 170 (such as being further bonded to the side sill 170), and the lower cross-sectional part 154 of the stiffener 150 extends downward and covers the curved part 122 of the dash panel 120**, as will be explicated in the following.

In addition, in the embodiment, as shown in FIGS. 1 to 3, the vehicle front structure 100 further includes a pillar 180 and a triangular gusset 190. The pillar 180 is disposed above the side sill 170, and extends along the vehicle upper-lower direction. In FIGS. 1 to 3, only one pillar 180 is shown, but a pair of pillars 180 may also be disposed in the left right direction. For example, the pillar 180 is disposed correspondingly above the front end 172 of the side sill 170. The dash panel 120, the side sill 170, and the pillar 180 are connected with each other, and the triangular gusset 190 is bonded to the upper surface 170*a* of the side sill 170 and a vehicle inner surface 180*a* of the pillar 180. More specifically, the triangular gusset 190 has an inclined surface 190*a* obliquely extending upward from the inner side of the side sill 170 toward the vehicle inner surface 180*a* of the pillar 180, and the dash panel 120 is provided with a bevel part 124 at the lower end on the outer side in the vehicle width direction. The bevel part 124 is inclined upward from a lower side (e.g., the inner side of the side sill 170) toward the outer side (e.g., the vehicle inner surface 180*a* of the pillar 180) in the vehicle width direction. The bevel part 124 of the dash panel 120, the upper surface 170*a* of the side sill 170, and the vehicle inner surface 180*a* of the pillar 180 form an opening part. The triangular gusset 190 is fit in the opening part so that the inclined surface 190*a* is bonded to the bevel part 124. Accordingly, the triangular gusset 190 is bonded to the bevel part 124 of the dash panel 120, the upper surface 170*a* of the side sill 170, and the vehicle inner surface 180*a* of the pillar 180. In addition, an outer end of the cross member 140 in the vehicle width direction (e.g., an outer end E1 of the upper cross-sectional part 142) is bonded to the bevel part 124. Accordingly, the cross member 140 is bonded to the side sill 170 and the pillar 180 through the triangular gusset 190 and the dash panel 120.

Accordingly, in the embodiment, as shown in FIG. 3, the stiffener 150 is bonded to the pillar 180 (as indicated by a broken line) at the upper edge of the stiffener 150 on the outer side in the vehicle width direction (e.g., an upper edge 152*b* of the upper cross-sectional part 152 on the outer side). In addition, the stiffener 150 is bonded to a lower surface 170*b* of the side sill 170 (indicated by a broken line) at the lower surface on the outer side in the vehicle width direction (e.g., a lower surface 154*a* of the lower cross-sectional part 154 on the outer side). More specifically, the lower cross-sectional part 154 of the stiffener 150 extends downward and covers the curved part 122 of the dash panel 120 to form a cross-sectional surface greater (i.e., having a larger cross-sectional area) than the upper cross-sectional part 152. In other words, the upper cross-sectional part 142 of the cross member 140 on the vehicle inner side is bonded to the upper surface 170*a* of the side sill 170 and the vehicle inner surface 180*a* of the pillar 180 via the bevel part 124 of the dash panel 120 and the triangular gusset 190, and the upper cross-sectional part 152 of the stiffener 150 on the vehicle outer side is bonded to the pillar 180 by using the upper edge 152*b* on the outer side. Correspondingly, the lower cross-sectional part 144 of the cross member 140 is further connected with the side sill 170 on the vehicle inner side, and the lower cross-sectional part 154 of the stiffener 150 covers the curved part 122 on the vehicle outer side and is bonded to the lower surface 170*b* of the side sill 170 by using the lower surface 154*a*. Thus, as shown in FIG. 4, a cross-sectional area A1 of the lower cross-sectional part 154 of the stiffener 150 is larger than a cross-sectional area A2 of the upper cross-sectional part 152. In particular, a height H1 of the lower cross-sectional part 154 of the stiffener 150 is greater than a height H2 of the upper cross-sectional part 152 and therefore able to cover the curved part 122 from the vehicle outer side.

With the above configuration, when a front collision occurs in the vehicle to which the vehicle front structure 100 is applied, the load transmitted from a component (e.g., the side frame 160, etc.) on the front side of the dash panel 120 to the dash panel 120 can be reliably transmitted toward the outer side in the vehicle width direction via the upper cross-sectional part 142 of the cross member 140 and the upper cross-sectional part 152 of the stiffener 150. In particular, the upper cross-sectional part 142 of the cross member 140 and the upper cross-sectional part 152 of the stiffener 150 are able to transmit the load to components with a higher rigidity, such as the side sill 170 and the pillar 180. In addition, the structural rigidity at a portion where the load may easily accumulate, such as a corner between the outer part and the lower part of the dash panel 120, is facilitated by using the triangular gusset 190 having a higher rigidity, so as to more effectively suppress the deformation of the lateral part of the dash panel 120. In addition, the triangular gusset 190 is able to transmit the load to the side sill 170 and the pillar 180. In addition, the lower cross-sectional part 154 having a larger cross-sectional area is formed at the stiffener 150. The lower cross-sectional part 154 having a larger cross-sectional area covers the curved part 122 from the vehicle outer side. Accordingly, the deformation of the curved part 122 of the dash panel 120 toward the vehicle inner side can be suppressed. Since the cross member 140 and the stiffener 150 are respectively bonded to the upper surface 170*a* and the lower surface 170*b* of the side sill 170, the cross member 140 and the stiffener 150 are able to transmit the load toward the entire (including the upper and lower sides) side sill 170. Accordingly, the vehicle front structure 100 is capable of effectively transmitting a collision load toward the outer side in the vehicle width direction, thereby facilitating vehicle body rigidity. However, the disclosure does not intend to limit the exact configurations of the side sill 170, the pillar 180, and the triangular gusset 190 and whether such components are disposed. Relevant configuration may be modified as needed.

In addition, in the embodiment, as shown in FIGS. 2 and 3, the cross member 140 and the stiffener 150 extend downward toward the outer side in the vehicle width direction, and widths W1 and W2 (i.e., widths of the lid-like structures) of opposing surfaces S1 and S2 of the upper cross-sectional parts 142, 152 of the cross member 140 and the stiffener 150 facing the dash panel 120 gradually increase toward the outer side in the vehicle width direction. In addition, concave parts 146, 156 recessed toward the dash panel 120 are respectively formed between the upper cross-sectional parts 142, 152 and the lower cross-sectional parts 144, 154 in the cross member 140 and the stiffener 150. That is, in the cross member 140, the upper cross-sectional part 142 and the lower cross-sectional part 144 respectively forming lid-like structures are defined by the concave part 146. That is, the portion above the concave part 146 is the upper cross-sectional part 142, and the portion below the concave part 146 is the lower cross-sectional part 144. In addition, in the stiffener 150, the upper cross-sectional part 152 and the lower cross-sectional part 154 respectively forming lid-like structures are defined by the concave part 156. That is, the portion above the concave part 156 is the upper cross-sectional part 152, and the portion below the concave part 156 is the lower cross-sectional part 154. In this way, the widths W1 and W2 of the upper cross-sectional parts 142, 152 of the cross member 140 and the stiffener 150 gradually increasing toward the outer side in the vehicle width direction allow transmission of the load toward the side sill 170 and the pillar 180 in a greater range. In addition, the concave parts 146 and 154 provided in the cross member 140 and the stiffener 150 are able to increase the ridgelines on the respective surfaces of the cross member 140 and the stiffener 150, thereby facilitating the structural rigidity of the cross member 140 and the stiffener 150. However, the disclosure does not intend to limit the specific configuration, etc., of the cross member 140 and the stiffener 150. Relevant configuration may be modified as needed.

Thus, in the embodiment, as shown in FIG. 4, the upper cross-sectional part 142 of the cross member 140 has the opposing surface S1 facing the dash panel 120 and a pair of lateral surfaces S3 and S4 extending from the opposing surface S1 toward the dash panel 120, thereby forming the lid-like structure. The lower cross-sectional part 144 has an opposing surface S5 facing the dash panel 120 and a pair of lateral surfaces S6 and S7 extending from the opposing surface S5 toward the dash panel 120, thereby forming the lid-like structure. Moreover, the concave part 146 is formed between the lateral surface S4 of the upper cross-sectional part 142 and the lateral surface S6 of the lower cross-sectional part 144. Thus, in the upper cross-sectional part 142 and the lower cross-sectional part 144 of the cross member 140, a distance D1 (i.e., the height of the lid-like structure) of the opposing surface S1 of the upper cross-sectional part 142 facing the dash panel 120 to the dash panel 120 is greater than a distance D2 of the opposing surface S5 of the lower cross-sectional part 144 facing the dash panel 120 to the dash panel 120. In addition, in the upper cross-sectional part 142 and the lower cross-sectional part 144 of the cross member 140, a distance D3 (i.e., the width of the lid-like structure) between the pair of lateral surfaces S6 and S7 extending from the opposing surface S5 of the lower cross-sectional part 144 toward the dash panel 120 is greater than a distance D4 (equivalent to the width W1) between the pair of lateral surfaces S3 and S4 extending from the opposing surface S1 of the upper cross-sectional part 142 toward the dash panel 120. That is, the upper cross-sectional part 142 is configured as a lid-like structure having a greater height and a smaller width, and the lower cross-sectional part 144 is configured as a lid-like structure having a smaller height and a greater width.

In this way, with the lower cross-sectional part 144 configured as a lid-like structure with a greater width, the coverage of the lower cross-sectional part 144 on the curved part 122 of the dash panel 120 can be increased. Accordingly, the rigidity of the periphery of the curved part 122 of the dash panel 120 is facilitated, so as to resist the load that bends the dash panel 120 toward the vehicle inner side. In addition, with the lower cross-sectional part 144 configured as a lid-like structure with a smaller height, a space on the vehicle compartment side (i.e., the rear side of the dash panel 120) is properly secured on the periphery of the curved part 122 of the dash panel 120 to serve as a foot placement area of the passenger. Correspondingly, with the upper cross-sectional part 142 configured as a lid-like structure with a greater height, the structural rigidity of the cross member 140 at the curved part 122 of the dash panel 120 and among the front frame 130, the pillar 180, and the side sill 170 can be facilitated. In this way, the front collision load taken by the front frame 130 is reliably transmitted toward the pillar 180 or the side sill 170, and the influence of the height of the lower cross-sectional part 144 on structural rigidity is suppressed and alleviated. However, the disclosure does not intend to limit the specific configurations and sizes of the upper cross-sectional part 142 and the lower cross-sectional part 144. Relevant configuration may be modified as needed.

Besides, in the embodiment, as shown in FIGS. 1 and 2, a bead part 134 extending in the vehicle front-rear direction is provided at the front frame 130. Also, the cross member 140 has a protrusion part 148 bonded to the bead part 134 of the front frame 130. The protrusion part 148 of the cross member 140 is, for example, formed on the inner side of the cross member 140 and corresponds to the upper cross-sectional part 142 and the lower cross-sectional part 144 (i.e., two protrusion parts 148 are provided). In addition, the protrusion part 148 is bonded to the bead part 134 of the front frame 130. In this way, the bead part 134 can increase the ridgeline on the surface of the front frame 130, thereby increasing the rigidity in the vehicle front-rear direction to cope with a front collision load. Moreover, the protrusion part 148 bonded to the bead part 134 can effectively transmit the load taken by the front frame 130 toward the triangular gusset 190, the side sill 170, and the pillar 180 via the cross member 140. However, the disclosure does not intend to limit the quantities, sizes, and exact positions of the bead part 134 and the protrusion part 148 and whether the bead part 174 and the protrusion part 189 are disposed. Relevant configuration may be modified as needed.

Besides, as an example, the vehicle front structure 100 is further provided with a floor passage C. The floor passage C is, for example, a frame structure extending in the vehicle front-rear direction, and is disposed at the center of the floor panel 110 in the vehicle width direction. That is, in the vehicle width direction of the floor panel 110, the floor passage C, the front frames 130, and the side sills 170 are arranged in order from the center to the sides. In this way, the overall rigidity of the vehicle front structure 100 is facilitated. Moreover, in correspondence with the cross member 140 extending from the front frame 130 toward the outer side in the vehicle width direction, the vehicle front structure 100 is further provided with a cross member 140A extending from the front frame 130 toward the inner side in the vehicle width direction. That is, the cross member 140 and the cross member 140A are disposed on the outer side and the inner side of the front frame 130 to serve as an outer cross member and an inner cross member. In this way, the load taken by the front frame 130 is transmitted toward the outer side in the vehicle width direction to the side sill 170, the pillar 180, and the triangular gusset 190 and transmitted toward the inner side in the vehicle width direction to the floor passage C. Accordingly, the overall rigidity of the vehicle front structure 100 is facilitated. However, the disclosure does not intend to limit the specific configuration of the components and whether the components are disposed. Relevant configuration may be modified as needed.

In view of the foregoing, in the vehicle front structure according to the embodiments of the disclosure, the cross member is disposed on the vehicle inner side of the dash panel, the stiffener is disposed on the vehicle outer side of the dash panel, and the stiffener and the cross member together sandwich the dash panel. In addition, the cross member and the stiffener are each provided with the upper cross-sectional part and the lower cross-sectional part configured as closed cross-sectional surfaces by using lid-like structures and corresponding to each other. The lower cross-sectional part is formed at the curved part of the dash panel, and the upper cross-sectional part is formed at a position higher than the lower cross-sectional part in the dash panel. The cross member and the stiffener may extend downward toward the outer side in the vehicle width direction, and may each be provided with a concave part recessed toward the dash panel between the upper cross-sectional part and the lower cross-sectional part. In this way, when a front collision occurs in the vehicle to which the vehicle front structure is applied, the upper cross-sectional parts are able to transmit the load transmitted from a component (e.g., a side frame) on the front side of the dash panel to the dash panel to the outer side in the vehicle width direction, and the lower cross-sectional parts are able to suppress the deformation of the curved part of the dash panel toward the vehicle inner side in addition to transmitting the load. Moreover, with the stiffener on the vehicle outer side and the cross member together sandwiching the dash panel, the size of the cross member on the vehicle inner side can be prevented from increasing. That is, it is not necessary to dispose a cross member having a large cross-sectional area. The rigidity of the cross member at a reduced height is facilitated by using the stiffener. Moreover, when an excessive load is input at the time of a front collision, damages to other components can be alleviated by absorbing the collision load through the deformation of the upper cross-sectional parts and the lower cross-sectional parts. Thus, the vehicle front structure according to the embodiments of the disclosure is capable of facilitating the vehicle body rigidity and optimizing the spatial layout on the vehicle inner side by effectively transmitting the collision load from the periphery of the curved part of the dash panel toward the outer side in the vehicle width direction.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle front structure, comprising:

a floor panel, disposed on a lower end side of a vehicle;

a dash panel, disposed on a front end side of the floor panel to partition a vehicle compartment and a front compartment, wherein a curved part curved toward the floor panel is provided at a lower part of the dash panel;

a front frame, disposed on a vehicle inner side of the dash panel, and extending along the dash panel to the floor panel in a vehicle front-rear direction;

a cross member, disposed on the vehicle inner side of the dash panel, and extending downward from the front frame toward an outer side in a vehicle width direction;

a stiffener, disposed on a vehicle outer side of the dash panel, and sandwiching, together with the cross member, the dash panel;

a side frame, disposed in front of the dash panel; and side sills, disposed on two sides of the floor panel in the vehicle width direction, and extending along the vehicle front-rear direction, wherein the cross member and the stiffener are each provided with an upper cross-sectional part and a lower cross-sectional part configured as closed cross-sectional surfaces by using lid-like structures and corresponding to each other, and the lower cross-sectional parts are formed at the curved part of the dash panel, and the upper cross-sectional parts are formed at positions higher than the lower cross-sectional parts in the dash panel, wherein upper surfaces of the upper cross-sectional parts of the cross member and the stiffener on an inner side in the vehicle width direction are respectively bonded to upper surfaces of the front frame and the side frame, and lower ends of the upper cross-sectional parts are inclined downward and extend along the vehicle width direction to positions higher than an upper surface of the side sill.

2. The vehicle front structure as claimed in claim 1, wherein the cross member and the stiffener extend downward toward the outer side in the vehicle width direction, and are each provided with a concave part recessed toward the dash panel between the upper cross-sectional part and the lower cross-sectional part.

3. The vehicle front structure as claimed in claim 1, wherein the front frame and the side frame are arranged along the vehicle front-rear direction to sandwich the dash panel; and the front frame and an upper flange of the side frame are at least partially overlapped.

4. The vehicle front structure as claimed in claim 1, further comprising:

a pillar, disposed above the side sill, and extending along the vehicle upper-lower direction; and a triangular gusset, bonded to the upper surface of the side sill and a vehicle inner surface of the pillar, and having an inclined surface obliquely extending upward from an inner side of the side sill toward the pillar, wherein a bevel part is provided at a lower end of the dash panel on the outer side in the vehicle width direction, and the bevel part is inclined upward from a lower part toward the outer side in the vehicle width direction, the bevel part of the dash panel, the upper surface of the side sill, and the vehicle inner surface of the pillar form an opening part, and the triangular gusset is fit in the opening part by bonding the inclined surface to the bevel part, and an outer end of the cross member in the vehicle width direction is bonded to the bevel part.

5. The vehicle front structure as claimed in claim 4, wherein an upper edge of the stiffener on the outer side in the vehicle width direction is bonded to the pillar, and a lower surface of the stiffener on the outer side in the vehicle width direction is bonded to a lower surface of the side sill, and the lower cross-sectional part of the stiffener extends downward and covers the curved part of the dash panel, so as to form a cross-sectional surface greater than the upper cross-sectional part of the stiffener.

6. The vehicle front structure as claimed in claim 1, wherein the front frame is provided with a bead part extending in the vehicle front-rear direction, and the cross member is provided with a protrusion part bonded to the bead part of the front frame.

7. The vehicle front structure as claimed in claim 1, wherein an opposing surface of each of the upper cross-sectional parts of the cross member and the stiffener facing the dash panel has a width in the vehicle upper-lower direction, and the width gradually increases toward the outer side in the vehicle width direction.

8. The vehicle front structure as claimed in claim 1, wherein in the upper cross-sectional part and the lower cross-sectional part of the cross member, a distance from an opposing surface of the upper cross-sectional part facing the dash panel to the dash panel is greater than a distance of an opposing surface of the lower cross-sectional part facing the dash panel to the dash panel.

9. The vehicle front structure as claimed in claim 8, wherein in the upper cross-sectional part and the lower cross-sectional part of the cross member, a distance between a pair of lateral surfaces extending from the opposing surface of the lower cross-sectional part toward the dash panel is greater than a distance between a pair of lateral surfaces extending from the opposing surface of the upper cross-sectional part toward the dash panel.

10. A vehicle front structure, comprising:

a floor panel, disposed on a lower end side of a vehicle;

a dash panel, disposed on a front end side of the floor panel to partition a vehicle compartment and a front compartment, wherein a curved part curved toward the floor panel is provided at a lower part of the dash panel;

a front frame, disposed on a vehicle inner side of the dash panel, and extending along the dash panel to the floor panel in a vehicle front-rear direction;

a cross member, disposed on the vehicle inner side of the dash panel, and extending downward from the front frame toward an outer side in a vehicle width direction; and a stiffener, disposed on a vehicle outer side of the dash panel, and sandwiching, together with the cross member, the dash panel, wherein the cross member and the stiffener are each provided with an upper cross-sectional part and a lower cross-sectional part configured as closed cross-sectional surfaces by using lid-like structures and corresponding to each other, and the lower cross-sectional parts are formed at the curved part of the dash panel, and the upper cross-sectional parts are formed at positions higher than the lower cross-sectional parts in the dash panel, wherein in the upper cross-sectional part and the lower cross-sectional part of the cross member, a distance from an opposing surface of the upper cross-sectional part facing the dash panel to the dash panel is greater than a distance of an opposing surface of the lower cross-sectional part facing the dash panel to the dash panel.

* * * * *